Nov. 10, 1953     W. TRAUPEL     2,658,336
PRESSURE CONTROL SYSTEM FOR GAS TURBINE PLANTS
Filed Oct. 17, 1950     2 Sheets-Sheet 1
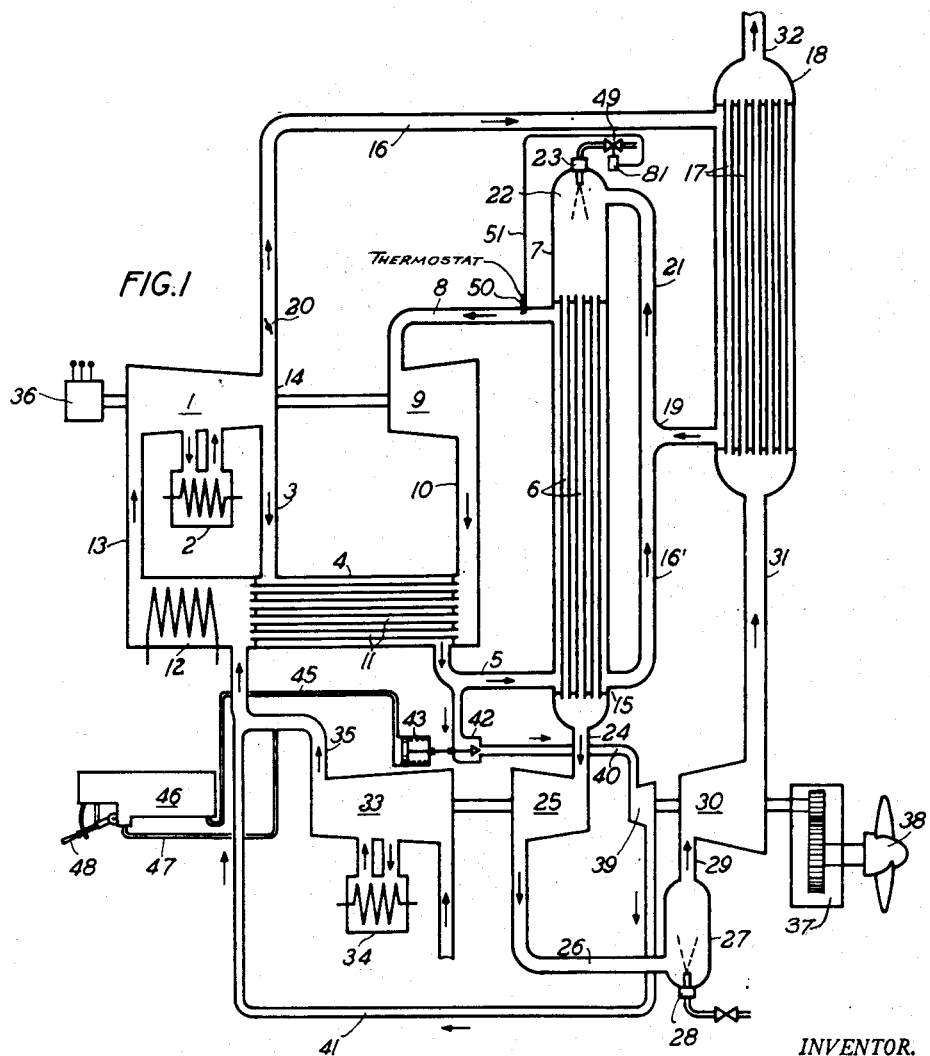
INVENTOR.
WALTER TRAUPEL
BY K. A. Mayr.
ATTORNEY.

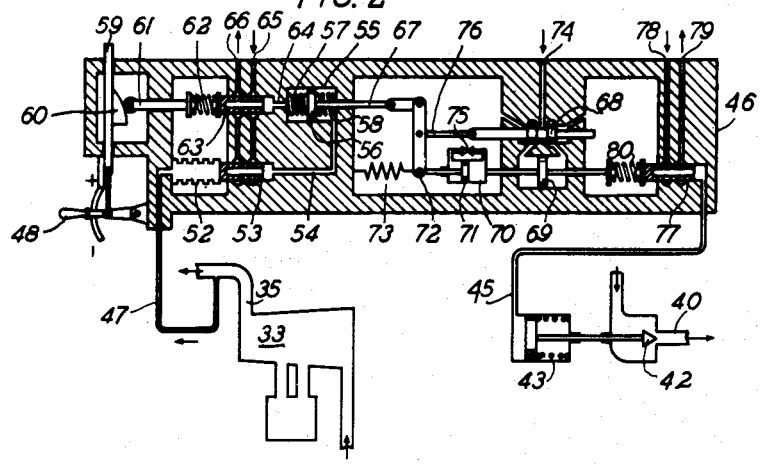
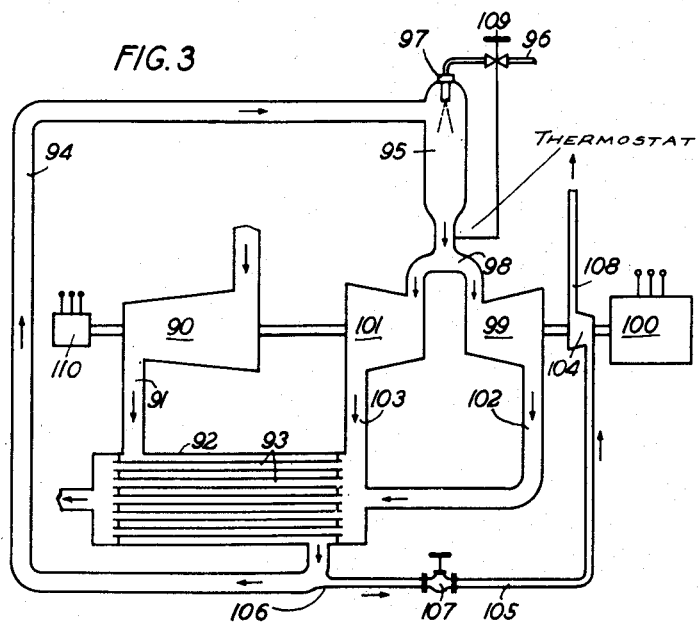

Patented Nov. 10, 1953

2,658,336

UNITED STATES PATENT OFFICE 2,658,336

PRESSURE CONTROL SYSTEM FOR GAS TURBINE PLANTS

Walter Traupel, Winterthur, Switzerland, assignor to Sulzer Frères, Societe Anonyme, Winterthur, Switzerland, a corporation of Switzerland Application October 17, 1950, Serial No. 190,621

Claims priority, application Switzerland October 18, 1949

4 Claims. (Cl. 60—39.18)

The invention relates to improvements of a gas turbine plant having at least one turbine producing outside power, at least one turbine mechanically independent of said first turbine and driving a compressor for compressing the working medium for said turbines, and a gas heater for heating the compressed working medium before it enters the turbines.

A disadvantage of a plant of this type is that the turbo-compressor does not furnish enough air when the plant operates under adverse conditions such as high atmospheric temperature, high temperature of the cooling water, clogging of the passages for the working medium, and the like. For example, high temperature of the outside air increases the power needed by the compressor for compressing a certain amount of air to a desired pressure and less outside power is made available by the plant, unless special provisions are made for compensating the adverse operating condition. The temperature at the inlet of the turbine driving the compressor for increasing the output of the plant can usually not be increased without jeopardizing operating safety. The speed of the air compressor will therefore be reduced upon increase of power requirement caused by the increased air temperature, and its air output and consequently the pressure of the operating medium of the plant will decrease. This reduces the outside power produced by the plant because it not only decreases the power produced by a certain amount of air but also decreases the amount of air itself. A similar situation arises if multistage air compression with cooling by cooling water between the stages is employed and the temperature of the cooling water increases unduly, or if the amount of working medium supplied by the compressor diminishes because of clogging of the passages for the medium.

It is an object of the present invention to provide improvements in a gas turbine plant by which adverse operating conditions due to high outside air temperature, high temperature of the coolant used in the plant, or clogging of the passages for the working medium are compensated. These improvements consist essentially in the provision of an auxiliary turbine which is mechanically connected with one of the plant turbines and which is at least temporarily operated by working medium diverted from the compressed working medium before it is heated to the temperature required for the operation of the main turbines of the plant. This auxiliary turbine furnishes at least temporarily a fraction of the power produced in the plant. If the aforementioned adverse conditions tend to reduce the output of the plant compressor, flow of compressed medium to the auxiliary turbine is reduced or interrupted, and the medium, normally diverted into the auxiliary turbine, is forced to circulate through the heater and the rest of the plant. This compensates to a large extent the reduction of power production caused by the adverse conditions, because, if the medium is air, it can be used for burning an additional amount of fuel in the gas heater without producing unduly high temperatures of the working medium operating the main turbines of the plant.

The auxiliary turbine may be coupled with the outside power turbine or with the turbo-compressor.

The auxiliary turbine is preferably operated by air drawn from the atmosphere and compressed in the compressor of the plant.

The arrangement according to the invention can be advantageously combined with a gas turbine plant comprising a circuit for a working medium which is compressed by a compressor in the circuit, heated by outside heat, expanded in a turbine in the circuit, which turbine drives the compressor, and recompressed in the compressor, a portion of the working medium being diverted from the circuit and expanded in at least two turbines, said portion being replaced by medium forced into the circuit by an additional compressor driven by one of said last mentioned two turbines. The auxiliary turbine receives working medium diverted from the circuit after it has been compressed in the circuit but before it is heated in the circuit and the medium is returned to the circuit at a point between the outlet of the turbine in the circuit and the inlet of the compressor in the circuit.

It is a further object of the invention to provide, in a gas turbine plant, an auxiliary turbine for the purposes set forth above and means for regulating the working medium supplied to the auxiliary turbine according to the pressure produced by the compressor supplying the plant with operating medium, whereby a predetermined pressure of the medium is maintained at all operating conditions.

Another object of the present invention resides in the provision, in a gas turbine plant equipped with an auxiliary turbine for the purposes explained supra, of a gas heater in which fuel is burned for heating the working medium of the plant and control means for the fuel supply to the heater which control means are responsive to the temperature of the operating medium heated in the heater for maintaining this temperature at a predetermined level.

In a plant comprising a heat exchanger for preheating the operating medium after it has been compressed in a compressor, the medium for operating the auxiliary turbine is preferably diverted after it has been preheated in the preheater but before its temperature is raised, for example, by an outside source of heat, to the temperature required for operating the main turbines of the plant.

Further and other objects of the present invention will be hereinafter set forth in the accompanying specification and claims, and are shown in the drawings which, by way of illustration, shown what I now consider to be preferred embodiments of the invention.

In the drawings:

Fig. 1 shows a diagrammatic layout of a modified closed cycle gas turbine plant equipped according to the invention;

Fig. 2 shows a diagrammatic layout of a regulator for controlling the part of the plant shown in Fig. 1 forming the subject of the present invention;

Fig. 3 shows a diagrammatic layout of an open cycle gas turbine plant improved according to the invention.

Like parts are designated by like numerals in all figures of the drawing.

Referring more particularly to Fig. 1, numeral 1 designates an air compressor having a cooler 2 interposed in the flow of the air through the compressor. The compressed air is conducted through conduit 3 into a heat exchanger 4 and therefrom through conduit 5 into a space surrounding heat exchange tubes 6 of a gas heater 7. The air heated indirectly by the gas produced in the direct gas heater 7 flows through conduit 8 into a turbine 9 in which it expands and cools and in which a substantial part of its energy is converted to mechanical power. The expanded air flows through conduit 10 and tubes 11 of the heat exchanger 4, preheating the compressed air reaching the heat exchanger through conduit 3. The expanded air leaving tubes 11 is further cooled in a cooler 12 before it is returned to compressor 1 through conduit 13.

Air is continuously diverted at points 14 and 15 from the above described circuit. The portion of the air taken from the circuit at 14 reaches, through conduit 16, the space surrounding tubes 17 of a heat exchanger 18 and is united at 19 with air which has left the circuit at point 15 and is conducted to point 19 in conduit 16'. For controlling the relative amounts of air withdrawn from the circuit, a valve 20 is provided in conduit 16. The air diverted from the circuit at points 14 and 15 and combined at 19 is directed through conduit 21 into the combustion chamber 22 of the gas heater 7 and serves as combustion air for the fuel entering the combustion chamber through burner 23. The combustion gas flows through tubes 6 for heating the air of the circuit set forth in the paragraph next above. After so losing a part of its heat the combustion gas reaches turbine 25 through conduit 24 and is thereupon reheated in heater 27 to which it is conducted through conduit 26. Heater 27 is a combustion chamber in which the oxygen left in the gas produced in heater 7 is used for burning fuel emerging from burner 28. The so reheated gas reaches turbine 30 through conduit 29 and flows, after expansion in turbine 30, through conduit 31 into tubes 17 of heat exchanger 18, transferring heat to the air from conduit 16. The expanded gas exhausts at 32 either into the atmosphere or is conducted to consumers of heat which do not form part of the present invention and are not illustrated.

To replace the air leaving the cycle at points 14 and 15, air is taken from the atmosphere and compressed by compressor 33, which is provided with an interstage cooler 34, and enters the circuit between the heat exchanger 4 and the cooler 12 through conduit 35.

Turbine 9, which is operated by air circulating in the circuit, drives the compressor 1 of the circuit and may have an electric motor generator connected to it for supplying energy to the plant, for example for starting it, and for converting surplus mechanical energy available from turbine 9 into electric energy. Turbine 25, which is operated by gas emerging from heater 7, drives compressor 33 which furnishes replacement air to the circuit. Turbine 30 produces useful work, for example for operating a ship's propeller 36 via a gear 37.

An auxiliary turbine 39 is connected to the shaft of the main turbine 30 and receives compressed and preheated air through conduit 40 from conduit 5 of the air circuit. The exhaust of the auxiliary turbine 39 is returned to the air circuit through conduit 41 which terminates in conduit 35 through which fresh air, compressed in compressor 33 is admitted to the air circuit. Admission of air to turbine 39 is controlled by a valve 42 which is operated by a servomotor 43 whose piston is actuated by a fluid whose pressure is adjusted by a regulator 46. The latter is actuated by the pressure of the air discharged by compressor 33, which pressure is transmitted to the regulator by conduit 47. The regulator 46, which will be described later, comprises a handle 48 by means of which the desired discharge pressure of compressor 33 can be adjusted.

The fuel supply to burner 23 of gas heater 7 is controlled by a valve 49 driven by a servomotor 81. This valve is so operated as to maintain a predetermined temperature of the air leaving heater 7 through conduit 8; to effect this, a thermostat 50 is provided in conduit 8 and connected with the servomotor 81 by temperature impulse transmitting means 51. Thermostatically controlled valves are conventional and therefore not illustrated. A control apparatus as shown in Fig. 2 of Patent No. 2,499,232 would be suitable.

Regulator 46 is illustrated diagrammatically in Fig. 2. The air pressure in conduit 35 is transmitted through pipe 47 to bellows 52, to one end of which a piston valve 53 is connected. This valve is longitudinally slidable in a cylinder and controls in the conventional manner the flow of a fluid from a conduit 65 to a conduit 66 and maintains the pressure of said fluid in said cylinder and conduit 54 connected thereto in proportion to the air pressure in conduit 35. The pressure of the fluid, for example oil, is transmitted through conduit 54 to one side of a piston 56 which is movable in cylinder 55 and yieldingly held in central position therein by means of springs 57 and 58.

By manipulating lever 48 a rod 59 carrying a cam 60 is displaced between positions indicated by + and —. Cam 60 determines the position of a cam follower rod 61 which acts on one end of a spring 62 whose other end is connected to a piston slide valve 63 which is similar to valve 53. The position of cam 60 determines the pressure exerted on spring 62 and the position of valve 63 which determines the flow of an operating fluid through conduits 65 and 66 to and from the cylinder for valve 63 and consequently the pressure in conduit 64 connecting said cylinder and cylinder 55. This pressure counteracts the pressure acting on the piston rod side of piston 56. Piston rod 67 of piston 56 is linked to a slide valve 68 by means of a lever 72 and a connecting rod 76. The far end of lever 72 is connected with the casing of the regulator by means of a spring 73 which tends to hold the lever in such position that valve 68 is in its neutral position in which no actuating fluid is admitted through conduit 74 to one side of a servomotor piston 69 or released from its other side. Piston 69 is rigidly connected with dash pot cylinder 70 and the movements of the piston are transmitted through dash pot piston 71 to the end of lever 72 to which spring 73 is connected, the latter counteracting said movements. The braking effect of the dash pot device is controlled by valve 75 in a conduit connecting the ends of cylinder 70. The regulator can come to rest, after a regulating action, in its neutral position only. This is the case when the pressure is the same on both sides of piston 56. The pressure on the head side, the left side in Fig. 2, of piston 56 is determined by the position of handle or lever 48.

The servomotor piston 69 actuates through spring 80 a piston valve 77 which controls flow of a fluid to and from conduit 45 through conduits 78 and 79, respectively. The pressure in conduit 45 controls the piston in servomotor 43 to which valve 42 is connected. Valve 77 is displaced and servomotor 43 actuated until piston 56 has returned to its central position, i. e. until the air pressure in conduit 35 has reached the desired value.

If the temperature of the air at the inlet of compressor 33 increases, the speed of the compressor decreases and less air is supplied to the air circuit. As soon as the air pressure at the outlet of the compressor, i. e. in conduit 35, falls, for this reason, below a predetermined value, regulator 46 will reduce the amount of air supplied through conduit 40 to the auxiliary turbine 39, whereby the deficiency of air supply by compressor 33 is compensated. Throttling of the compresed air supply to turbine 39 continues until the temperature of the air taken in by compressor 33 has come down to a value corresponding to normal operating conditions of the plant.

The regulator 46 may be so adjusted that, at normal operating conditions, valve 42 is open and is closed partly or entirely only at the described adverse operating conditions, so that at adverse operation conditions also the plant produces the required power without undue increase of the temperature, i. e. undue heating, of the operating medium. However, the regulator 46 may be so adjusted that valve 42 is in an intermediate position at normal operating conditions of the plant and is continually regulated to compensate abnormal operating conditions.

Fig. 3 illustrates the application of the invention to an open cycle gas turbine plant. Air is taken from the atmosphere and compressed in compressor 90 from which it is conducted through conduit 91 into the space of a heat exchanger 92 surrounding tubes 93. A part of the so compressed and preheated air flows through conduit 94 to combustion chamber 95 and serves for burning fuel supplied through conduit 96 and burner 97. A part of the mixture of hot air and combustion gas produced in heater 95 flows through conduit 98 into the main turbine 99, producing power for operating an electric generator 100. Another part of the hot mixture expands in turbine 101 driving compressor 90. After expansion of the medium in turbines 99 and 101 to substantially atmospheric pressure, it is conducted through conduits 102 and 103 into the heat exchange tubes 93 of heat exchanger 92 in which a part of the residual heat in the medium is transferred to the compressed fresh air supplied through conduit 91.

An auxiliary electric machine 110 is connected with the shaft of turbo-compressor 101, 90, which machine serves as a motor for starting the plant and for supplying power to the plant if there is a deficiency, or as generator for converting surplus mechanical energy to electric energy.

According to the invention, an auxiliary turbine 104 is connected with the shaft of the main turbine 99. The auxiliary turbine can be supplied through conduit 105 with air which is compressed in compressor 90 and preheated in heat exchanger 92, conduit 105 being connected with conduit 94 at point 106 and provided with a valve 107 for controlling the flow of air to turbine 104, in which the air is expanded to atmospheric pressure and from which it is exhausted to the atmosphere through conduit 108. The power produced by turbine 104 contributes to the operation of generator 100.

Air supply to turbine 104 can be reduced or interrupted by closing value 107 if, for example, the speed of compressor 90 is reduced because of a rise of the temperature of the atmospheric air, or if the power output of the plant diminishes due to fouling or clogging of the gas or air conduits and passages of the plant. The air, otherwise flowing to turbine 104, must now pass through conduit 94 to the gas heater 95 and can be used for burning additional fuel without causing an undesired increase of the temperature of the gas operating turbines 99 and 101. The supply of fuel to burner 97 is controlled by a valve 109 in conduit 96 which valve may be operated by hand or automatically, like valve 49 in the plant according to Fig. 1, depending upon the temperature of the gas leaving heater 95.

The described arrangement affords compensation of a deficiency of power output to a large extent by increasing the output of compressor turbine 101 and of the main turbine 99.

If the temperature of the atmospheric air or of the cooling water for coolers 2, 12, 34 in Fig. 1 causes an undesired increase of power output of gas turbine plants according to the invention, the fuel supplied to heaters 7 or 95 in Figs. 1 and 3, respectively, must be reduced rather than that the air supply to the auxiliary turbine be increased. This will considerably lengthen the life of those parts of the plant which are subject to high temperatures.

The invention is not limited to the embodiments illustrated in Figures 1 to 3. Regulators equivalent to the one shown may be used to produce the same result and may be actuated by mechanical or electrical means instead of the hydraulic or pneumatic means shown and described. The subject matter of the invention can be applied to a fully closed cycle gas turbine plant instead of to the modified closed cycle and open cycle plants shown and described, without departing from the scope of the invention as defined by the claims.

I claim:
1. A gas turbine plant comprising, in combination, a compressor, a first turbine driving said compressor, a second turbine producing outside power and being mechanically independent of said first turbine, a gas heater connected with said turbines for supplying a heated working medium thereto, conduit means interconnecting said compressor and said gas heater for flow of compressed working medium from the compressor to the gas heater, an auxiliary turbine mechanically connected with one of said turbines and connected with said conduit means for receiving compressed working medium therefrom, means responsive to the pressure of the working medium leaving said compressor, and medium flow control means connected with said auxiliary turbine and with said pressure responsive means for controlling the supply of working medium to said auxiliary turbine according to the pressure of the medium leaving the compressor.

2. A gas turbine plant comprising a circuit for a working medium, said circuit including a compressor for compressing the working medium of the circuit, an indirect gas-heated heater connected to receive compressed working medium from said compressor, a turbine driving said compressor and being connected to receive compressed and heated working medium from said indirect heater, first conduit means returning the medium expanded in said turbine to said compressor, and cooling means in said first conduit means; second conduit means connected with said circuit for diverting working medium therefrom, a fuel fired direct gas heater in said second conduit means, said direct gas heater being connected to and furnishing the heating medium to said indirect gas heater, two turbines which are mechanically independent of the circuit turbine connected to and operated by working medium heated in said direct gas heater, a compressor driven by one of said two turbines and pumping working medium into said circuit to replace the diverted medium, the other of said two turbines serving as power output turbine of the plant, an auxiliary turbine mechanically connected with said other turbine for augmenting the power output of said plant and operated by working medium diverted from said circuit after it has been compressed and before it is heated in said indirect heater, and a conduit connecting said auxiliary turbine with said first conduit means for returning the medium expanded in said auxiliary turbine to the circuit.

3. A gas turbine plant as defined in claim 2, said two turbines being connected in series for flow of working medium therethrough.

4. A gas turbine plant as defined in claim 2, comprising a second fuel-fired direct gas heater interposed in the flow of working medium between said two turbines.

WALTER TRAUPEL.

References Cited in the file of this patent

UNITED STATES PATENTS

| Number | Name | Date |
|---|---|---|
| 2,219,994 | Jung | Oct. 29, 1940 |
| 2,298,663 | Traupel | Oct. 13, 1942 |
| 2,303,295 | Allen | Nov. 24, 1942 |
| 2,409,159 | Singleton | Oct. 8, 1946 |
| 2,476,031 | Farkas et al. | July 12, 1949 |
| 2,477,184 | Imbert et al. | July 26, 1949 |

FOREIGN PATENTS

| Number | Country | Date |
|---|---|---|
| 493,174 | Great Britain | Oct. 4, 1938 |